United States Patent [19]

Gamoh et al.

[11] Patent Number: 4,658,778

[45] Date of Patent: Apr. 21, 1987

[54] PIGGYBACK TYPE BLOWER UNIT

[75] Inventors: Akira Gamoh, Kodaira; Takashi Miura, Higashiyamato; Toshiharu Sawada, Fuchu; Katsumi Kiyooka, Warabi, all of Japan

[73] Assignee: Komatsu Zenoah Co., Higashiyamato, Japan

[21] Appl. No.: 786,238

[22] Filed: Oct. 10, 1985

[30] Foreign Application Priority Data

Oct. 16, 1984 [JP] Japan .......... 59-155035[U]
Oct. 18, 1984 [JP] Japan .......... 59-156352[U]

[51] Int. Cl.[4] .......... B05B 3/10

[52] U.S. Cl. .......... 123/195 C; 417/234; 417/312; 417/364; 239/152; 239/153

[58] Field of Search .......... 417/234, 312, 364; 239/152, 153; 123/195 C

[56] References Cited

U.S. PATENT DOCUMENTS 2,971,507 2/1961 Kiekhaefer .......... 417/312
3,223,172 12/1965 Moss .......... 239/152 X
3,539,110 11/1970 Kobayashi .......... 239/152 X
4,266,515 5/1981 Bross .......... 123/195 CX
4,435,877 3/1984 Berfield .......... 417/312 X

FOREIGN PATENT DOCUMENTS 1361000 6/1964 France .......... 239/152
1139998 1/1969 United Kingdom .......... 239/152

*Primary Examiner*—Carlton R. Croyle
*Assistant Examiner*—Theodore W. Olds
*Attorney, Agent, or Firm*—Samuels Gauthier

[57] ABSTRACT

There is provided a piggyback type blower unit. The blower unit comprises a piggyback frame, a fan case incorporating a fan, a powder tank arranged on top of the fan case, a fuel tank arranged behind said fan case, and an engine fixed behind the fan case and on top of the fuel tank. The piggyback frame comprises hollow frame members and is connected to the suction side of the engine to form a suction path for sucking and supplying air for the engine through the suction path, or connected to the suction side of the fan to form a suction path for sucking and supplying air for the fan through the suction path. An air cleaner is inserted within the hollow piggyback frame on the suction path communicating with the suction side of the engine.

5 Claims, 11 Drawing Figures

PIGGYBACK TYPE BLOWER UNIT

BACKGROUND OF THE INVENTION

1. Field of the Invention

The present invention relates to a piggyback type blower unit in which a blower unit is installed to a piggyback frame to spray chemicals or to blow and gather dust on the ground.

2. Description of the Prior Art

In the piggyback type blower unit of the prior art, a large sized air cleaner or a suction silencer is not attached to the blower unit because of the need to reduce the weight and the size thereof. Instead, a small sized air cleaner is used for the blower unit.

However, such a small sized air cleaner requires frequent maintenance operation, because chemicals and dust clog the air cleaner. Further, a large sized suction silencer which will reduce noise considerably cannot be installed to the blower unit due to the limited space of the blower unit.

Further, in the conventional piggyback type blower unit, an air intake has its opening in the vicinity of the ear of an operator so that loud noise may be propagated to the operator. In order to reduce noise, the conventional blower unit has a separable insulating board arranged between the air intake and the ear, or a separate air intake path having a downwardly or rearwardly opening mouth. However, the insulating board is less effective in reducing noise, and the air intake path pushes the production cost up, increases the overall size of the blower unit, and is difficult to install due to the limited space.

SUMMARY OF THE INVENTION

An object of the present invention is to provide a piggyback type blower unit having a large sized air cleaner and suction silencer installed within a limited space of the blower unit.

Another object of the present invention is to provide a piggyback type blower unit in which the opening of an air intake path is provided away from the ear of an operator.

A third object of the present invention is to provide a piggyback type blower unit which requires neither an insulating board nor a separate air intake path to reduce noise.

Another object of the present invention is to provide such a piggyback type blower unit as mentioned above with a simple structure and low cost.

In order to accomplish the objects and advantages mentioned above, there is provided according to the present invention a piggyback type blower unit in which an air intake path is provided within a piggyback frame, and a large sized air cleaner and suction silencer are provided by utilizing the hollow portion of the frame.

DETAILED DESCRIPTION OF THE EMBODIMENT

Figure 1:
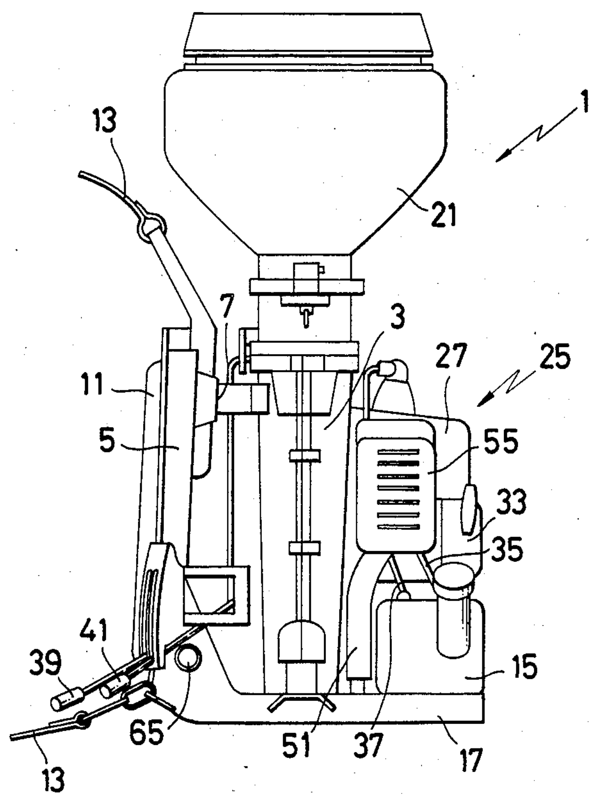
FIG. 1 is a side view showing a piggyback type blower unit according to the present invention.
Figure 2:
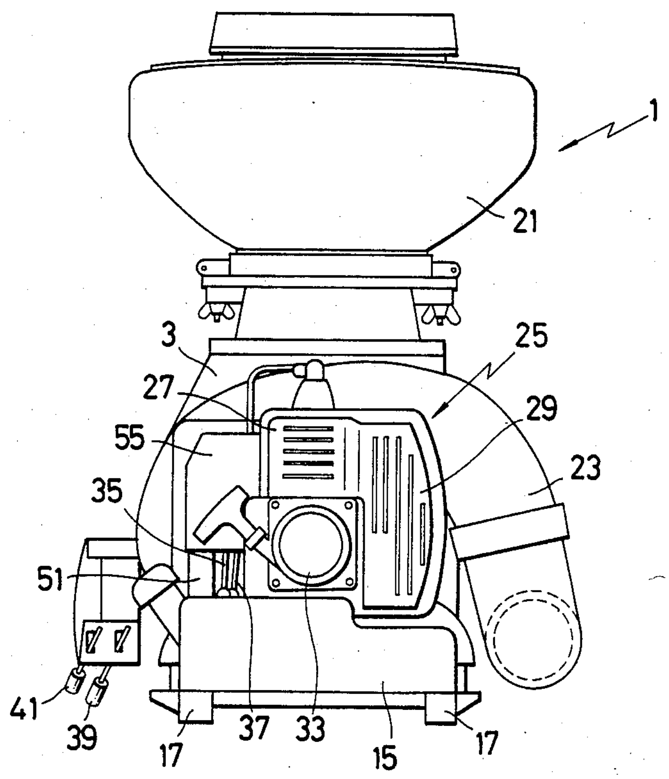
FIG. 2 is a rear view showing the piggyback type blower unit according to the present invention.
Figure 3:
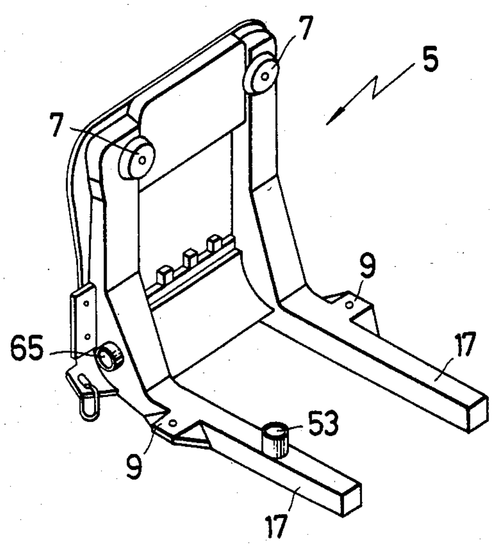
FIG. 3 is a perspective view showing a main part of first embodiment of the present invention.
Figure 4:
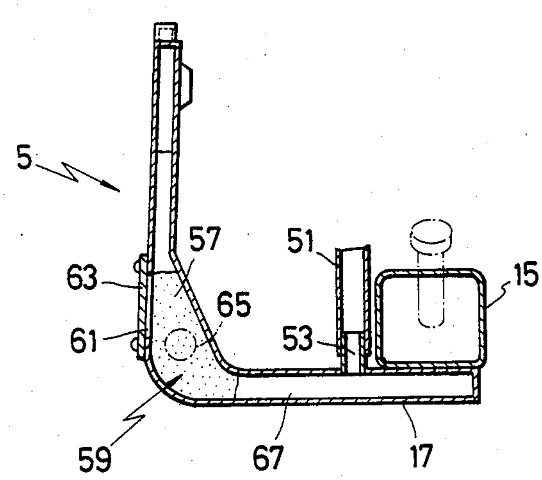
FIG. 4 is a cross sectional side view taken through the main part of the first embodiment.
Figure 5:
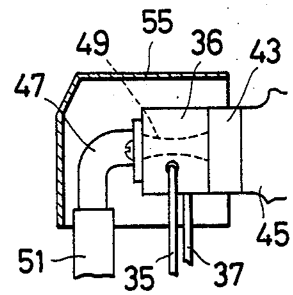
FIG. 5 is a cross sectional side view showing another part of the first embodiment.

The details of the present invention are now described with reference to accompanied drawings.

In the figures, the numeral 1 represents a piggyback type blower unit. A fan case 3 incorporating a fan (not shown) is fixed to a piggyback frame 5 made of synthetic resin by bolts (not shown) through fixing seats 7 and 9. The piggyback frame 5 is provided with a back pad 11 and a shoulder strap 13. A fuel tank 15 is arranged on a horizontal frame portion 17 located at the lower part of the piggyback frame 5. A powder tank 21 is arranged on top of the fan case 3. Powdered chemicals stored within the powder tank 21 are sent through a shutter, which is arranged to open and close the tank bottom, into a duct 23 of the fan case 3 in which the chemicals are mixed with blowing air. The mixed air is sprayed from a nozzle located at the end of a blower pipe (not shown) communicating with a duct 23. An engine 25 is installed at the backside of the fan case 3. The numeral 27 represents a cylinder cover, 29 a muffler cover, and 33 a recoil starter. A fuel pipe 35 provides communication between the fuel tank 15 and a carburetor 36. The numeral 37 represents an overflow pipe of the carburetor 36. The numeral 39 represents a throttle lever, and 41 a shutter lever.

The carburetor 36 communicates with a suction port 45 of the engine 25 through a heat insulation member 43. A communicating pipe 47 communicates with an intake port 49 of the carburetor 36. One end of a connecting hose 51 communicates with the communicating pipe 47, and the other end of the hose 51 is connected to a connecting pipe 53 provided to the horizontal frame portion 17 of the piggyback frame 5. A carburetor cover 55 covers the carburetor 36. A sponge like filter 57 is inserted in a hollow portion 59 formed within the piggyback frame 5. The filter 57 is inserted in the hollow portion 59 through an opening 61 located at the front side of the piggyback frame 5. A lid 63 covers the opening 61. The hollow portion 59 communicates with atmosphere through an intake hole 65, and communicates with the connecting pipe 53 through an elongated suction silencer portion 67.

In this embodiment, an operator puts the back pad 11 of the piggyback frame 5 on his back and shoulders the piggyback frame 5 with the shoulder strap 13 to spray chemicals through the nozzle of the blower pipe (not shown) while gripping the blower pipe. Air for the engine 25 is sucked from the intake hole 65, passed through the filter 57 to filter dust, etc., therefrom, passed through the suction silencer portion 67, the connecting hose 51 and the connecting pipe 47, and sucked by the carburetor 36. The suction noise of the engine 25 is reflected and interfered by the internal wall of the elongated suction silencer portion 67 so that noise propagating outside the intake hole 65 may be reduced. The connecting pipe 53 may be provided at the vertical portion of the piggyback frame 5, and the intake hole 65 at the horizontal frame portion 17. The suction silencer portion 67 may be provided between the intake hole 65 and the air filter 57.

According to the structure mentioned above, a large sized air cleaner and suction silencer can be received within the piggyback frame so that a light and compact blower unit is materialized.

Figure 6:
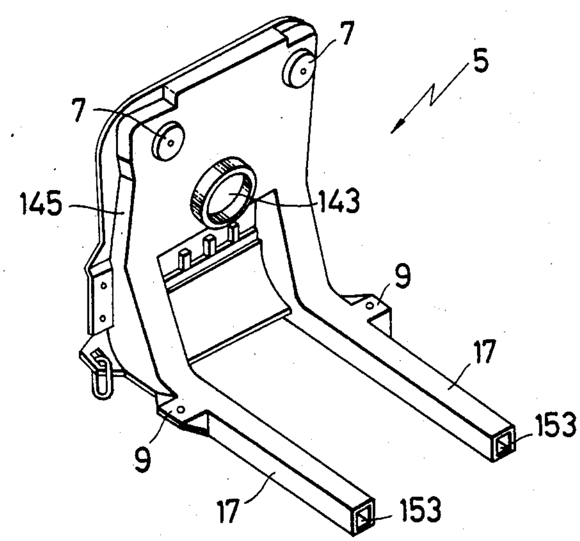
FIG. 6 is a perspective view showing a main part of a second embodiment of the present invention.
Figure 7:
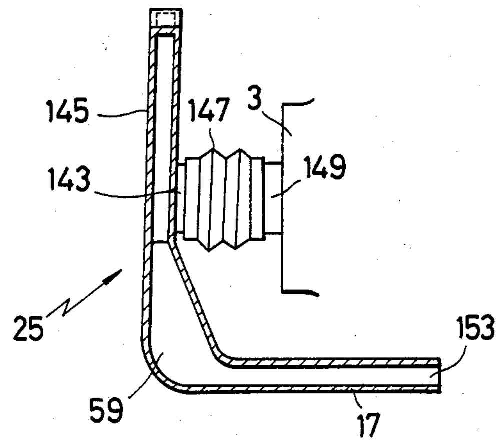
FIG. 7 is a cross sectional side view taken through the main part of the second embodiment.
Figure 8:
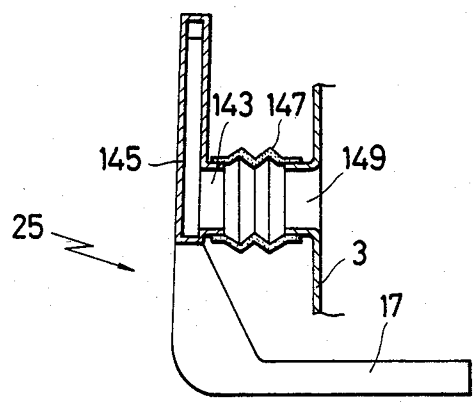
FIG. 8 is a cross sectional side view showing another part of the second embodiment.

FIGS. 6 to 8 show the second embodiment of the present invention. In the figures, the like numerals shown in FIGS. 1 to 5 represent the like parts. A communicating mouth 143 is provided for a vertical frame portion 145 of the piggyback frame 5 and communicates via a suction hose 147 with a suction opening 149 of the fan case 3. The communicating mouth 143 communicates via the hollow portions 59 within the piggyback frame 5 with suction openings 153 which are open at the rear sides of the horizontal frame portions 17.

In this embodiment, suction air for the fan is sucked from the suction openings 153 at the ends of the horizontal frame portions 17, passed through the hollow portions 59, the communicating mouth 143 and the suction hose 147, and sucked in the suction opening 149 of the fan. Since the suction openings 153 are located far from the ears of the operator at the backside of the operator, noise will not be propagated to the ears of the operator loudly.

Figure 9:
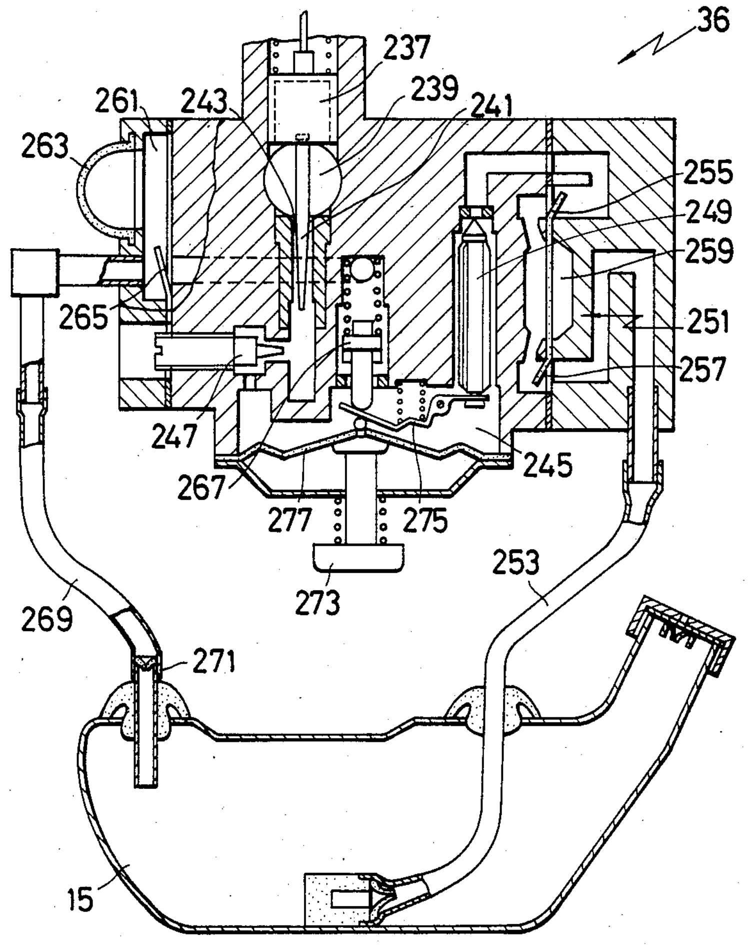
FIG. 9 is a cross sectional front view showing a fuel supplying mechanism for the blower unit according to the present invention.

FIG. 9 shows a fuel supplying mechanism for the blower unit according to the present invention. Throttle valve 237 opens and closes an air path 239 of the carburetor 15. A needle valve 241 regulates the area of a nozzle 243 which opens toward the air path 239. The needle valve 241 is attached to the throttle valve 237. The air path 239 provides communication between the suction port of the engine 25 and the air cleaner. A fuel chamber 245 communicates with the nozzle 243 via a regulator valve 247, and communicates with the fuel tank 15 via the needle valve 249, a diaphragm pump 251 and a fuel feeding hose 253. The numerals 255 and 257 represent check valves of the diaphragm pump 251, and the numeral 259 a pressure chamber for actuating the diaphragm pump 251, which communicate with a crank case (not shown) of the engine 25 to repeat the positive and negative pressure alteration. A pump chamber 261 located behind a manual pump 263 made of rubber communicates with the fuel chamber 245 via a check valve 265 and an open/close valve 267. An overflow pipe 269 provides communication through a check valve 271 between the pump chamber 261 and the fuel tank 15. A knob 273, if it is pushed upwardly, opens the open/close valve 267 and the needle valve 249 through a lever 275. A diaphragm 277 cooperates with the knob 273.

In this embodiment, to start the engine 25, the manual pump 263 is repeatedly pushed and released, which operation lowers the pressure within the fuel chamber 245 so that the fuel is sucked into the fuel chamber 245 through the fuel feeding hose 253, the diaphragm pump 251 and the needle valve 249. If the fuel chamber 245 is filled with fuel, excess fuel returns to the fuel tank 15 through the overflow pipe 269 so that the excess fuel may not overflow outside. To start the engine under the condition that the fuel chamber 245 is filled with fuel, it is necessary only to operate the knob 273. Once the engine 25 starts to rotate, fuel is automatically fed to the fuel chamber 245 by the operation of the diaphragm pump 251, sprayed from the nozzle 243, and mixed with intake air within the air path 239. Since the fuel tank 15 is located under the engine 25, fuel will not drop on the engine 25 even if the fuel overflows from a fuel filling mouth of the fuel tank 15.

Figure 10:
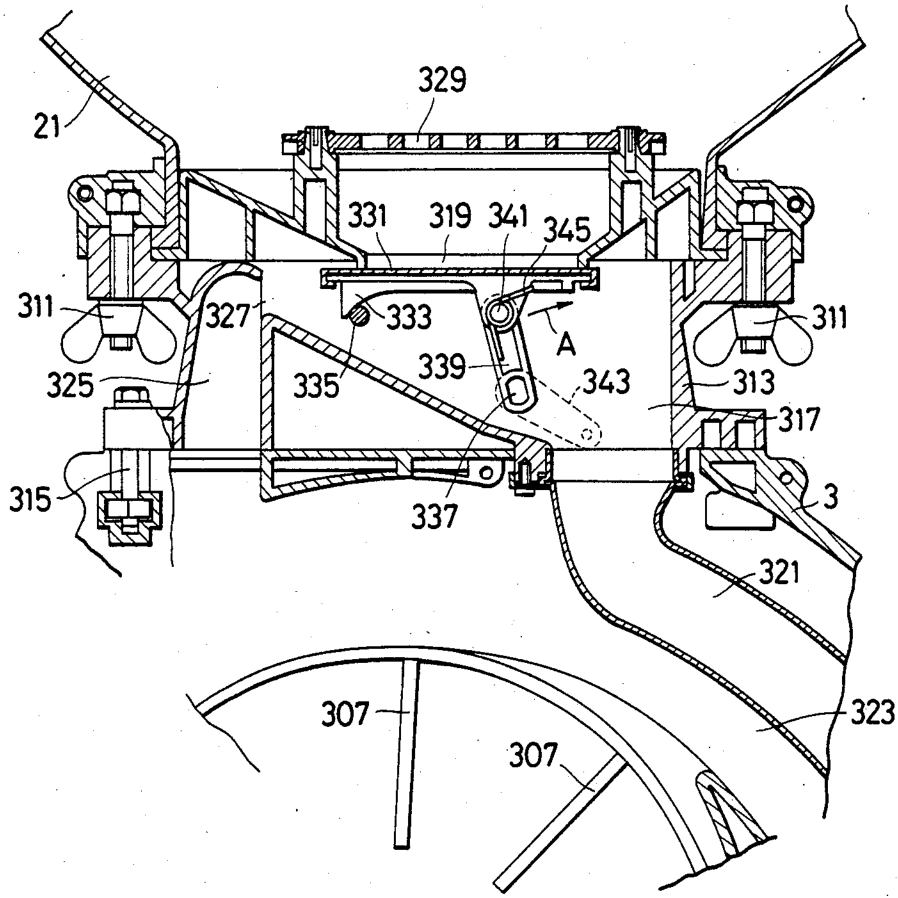
FIG. 10 is an enlarged cross sectional front view showing a powder supplying mechanism for the blower unit according to the present invention.
Figure 11:
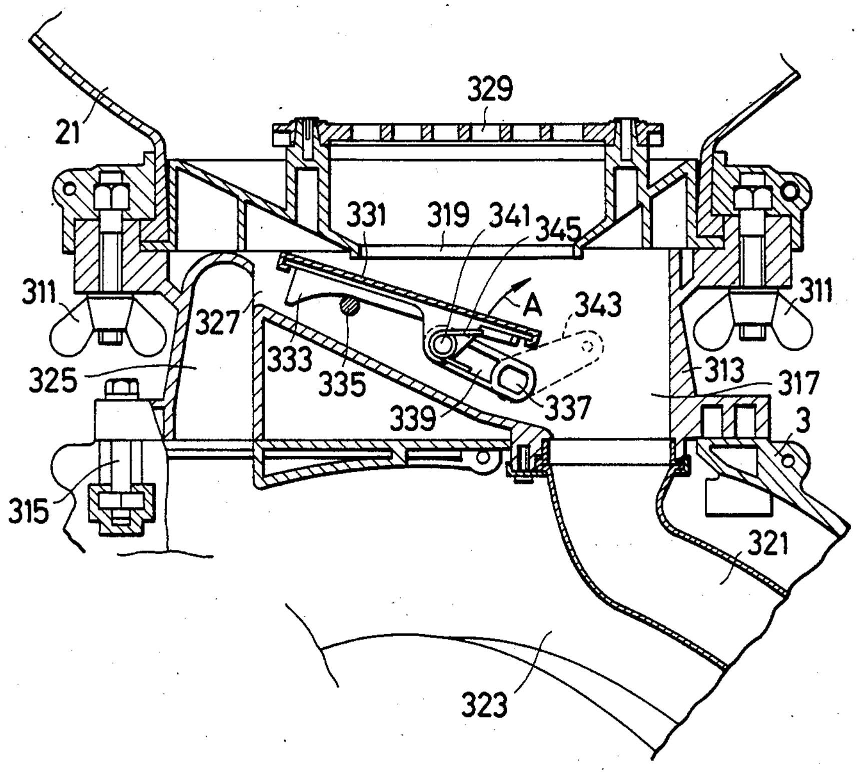
FIG. 11 is an enlarged cross sectional front view showing another state of the powder supplying mechanism.

FIGS. 10 and 11 show a powder supplying mechanism for the blower unit according to the present invention. A fan 307 is incorporated within the fan case 3 and driven by the rotation of the engine 25. The powder tank 21 is fixed to the upper part of the fan case 3 by means of thumbscrews 311. An intermediate body 313 is formed by dividing the upper part of the fan case 3 and coupled to the upper part of the fan case 3 by bolts 315. A powder chamber 317 communicates with an opening 319 of the bottom of the powder tank 21, the bottom of the chamber 317 communicating with a powder path 321. The lower end of the powder path 321 opens in a blast path 323 of the fan 307. The blast path 323 communicates with a powder hose (not shown). A pressure chamber 325 sends a part of blasting air generated by the fan 307 through a blast opening 327 to the powder chamber 317. A netting portion 329 is provided at the upper part of the opening 319. A shutter 331 opens and closes the opening 319 and is supported by an axial supporting member 335 through a cam 333 provided at the bottom of the shutter 331. The both ends of the supporting member 335 are fixed to the fan case 3. A pivot 337 passes through the fan case 3 horizontally. One end of an arm 339 is fixed to the internal end of the pivot 337, and the other end of the arm 339 is pivotally fixed to the lower surface of the shutter 331 by means of an axis 341. An operational arm 343 is fixed to the outer end of the pivot 337. A spring 345 is wound around the axis 341 to push the shutter 331 toward the supporting member 335. The shutter lever 41 cooperates with the operational arm 343 through a rod (not shown). The throttle lever 39 cooperates with a throttle (not shown) of the engine 25. The fuel tank 15 is arranged under the engine 25.

According to the embodiment mentioned above, before the operation, the arm 339 is moved in the direction of an arrow A shown in FIG. 10 by the shutter lever 41 so that the cam 333 pushes the supporting member 335, and, due to the reaction, the shutter 331 closes the opening 319. In operation, the engine 25 rotates the fan 307. Then, the shutter lever 41 is operated in the reverse direction to move the arm 339 in the opposite direction against the arrow A shown in FIG. 10. The shutter 331 opens the opening 319 to take a position shown in FIG. 11. Chemicals contained in the powder tank 21 enter into the powder path 321 from the powder chamber 317, reach the end of the powder path 321, and are mixed with blowing air in the blow path 323. The chemicals are then sprayed from the nozzle of a spraying hose (not shown). The cam 333 of the shutter 331 is released from the supporting member 335 at the time of opening as shown in FIG. 11 so that a gap is formed between the end on the cam side of the shutter 331 and the edge of the opening 319. As a result, pressurized air contained in the pressure chamber 325 is sent through the blowing mouth 327 and the upper and lower surfaces of the shutter 331 into the powder chamber 317. The flow of chemicals thus becomes good. To stop spraying, the shutter level 41 is operated to turn the arm 343 in the direction of the arrow A shown in FIG. 11 to close the opening 319 from the diagonal downward direction by the action of the cam 333 contacting with the supporting member 335. The shutter 331 is always pushed toward the supporting member 335 by the spring 345 so that the shutter 331 does not swing due to wind pressure at the time of opening.

It shall be understood that the present invention is not limited to the embodiments mentioned in the above, and many modifications may be made according to the present invention.

What is claimed is:

1. A piggyback type blower unit comprising:

a frame having a vertical frame portion adapted to be removably supported on a user's back and a horizontal frame portion integrally joined to and extending rearwardly from said vertical frame portion, said frame being hollow and having mutually spaced air inlet and outlet openings communicating with and interconnected by the interior thereof;

a fan case incorporating a fan, said fan case being attached to said frame at a location disposed rearwardly of said vertical frame portion;

a powder tank arranged above and in communication with said fan case;

a fuel tank arranged rearwardly of said fan case on said horizontal frame portion;

an internal combustion engine arranged behind said fan case and above said fuel tank, said engine having an air suction port; and means for connecting said suction port to said air outlet opening, thereby establishing a flow path for engine combustion air through the interior of said frame via said inlet and outlet openings and externally of said frame from said outlet opening to said suction port via said connecting means.

2. The blower unit of claim 1 wherein an air filter of sponge like material is contained within said frame in the air flow path between said inlet and outlet openings.

3. The blower unit of claim 1 wherein said inlet and outlet openings are arranged respectively in said horizontal and vertical frame portions.

4. The blower unit of claim 2 wherein said horizontal and vertical frame portions are joined by an intermediate frame portion and wherein said air filter is contained in said intermediate frame portion.

5. The blower unit of claim 4 wherein said inlet opening is located in said intermediate frame portion and said outlet opening is located in said horizontal frame portion.

* * * * *